I. YOUNG.
Shovel Plow.
No. 61,980.
Patented Feb. 12, 1867.
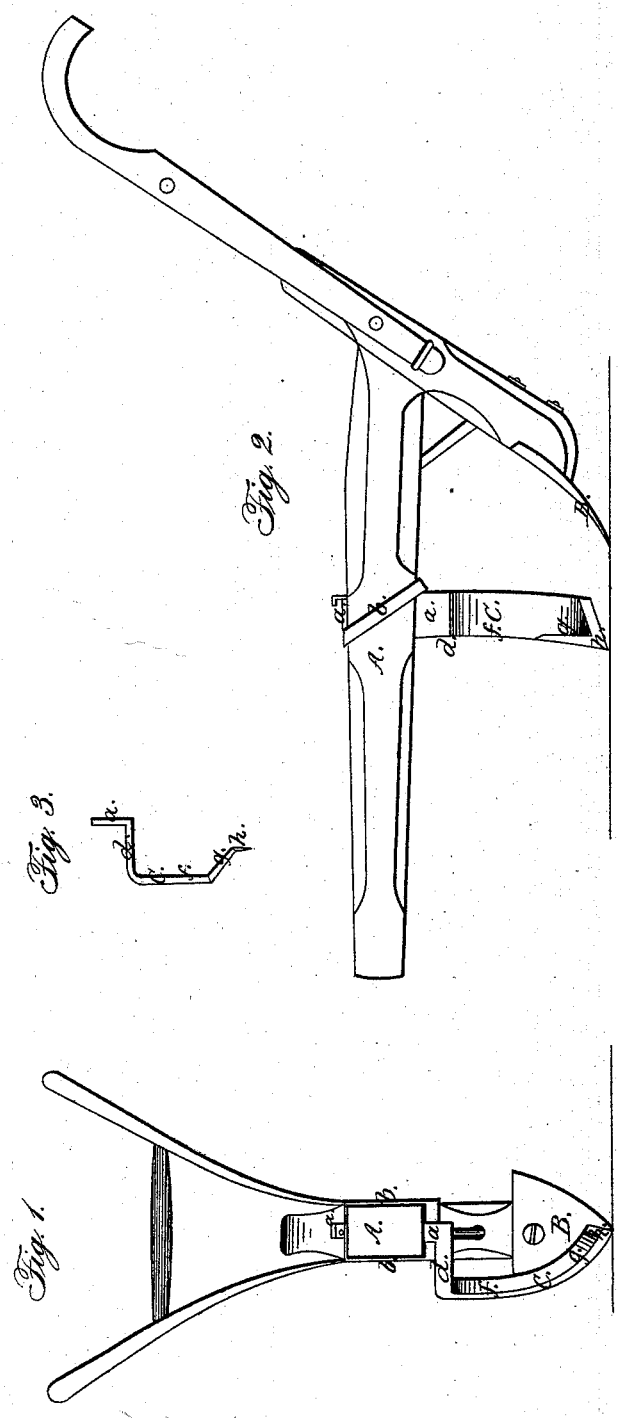
Witnesses:
Inventor:

United States Patent Office.

ISAAC YOUNG, OF BYHALIA, MISSISSIPPI, ASSIGNOR TO HIMSELF AND ISHAM H. HAYES, OF THE SAME PLACE.

*Letters Patent No. 61,980, dated February 12, 1867.*

IMPROVEMENT IN COMBINED CULTIVATOR AND PLOUGH.

*The Schedule referred to in these Letters Patent and making part of the same.*

TO ALL WHOM IT MAY CONCERN:

Be it known that I, ISAAC YOUNG, of Byhalia, in the county of Marshall, and State of Mississippi, have invented an improved Cultivating Attachment to Shovel or other Ploughs; and I do hereby declare that the following is a full and exact description thereof, reference being had to the accompanying drawings, making part of this specification—

Figure 1 being a front view of a shovel-plough provided with my cultivating attachment.

Figure 2, a side view of the same.

Figure 3, a front or forward edge view of the attachment by itself.

Like letters designate corresponding parts in all of the figures.

Let A represent the beam of a common shovel-plough, and B the shovel or share. In the place of the ordinary coulter I secure my attachment, C, its shank, $a$, extending up through a mortise in the beam A. It may be secured more strongly in place by means of a diagonal band or gripe, $b$, of iron, passing round the beam, as shown. The attachment is made thin, and sufficiently wide to give it strength and fulfill all its functions, as herein set forth, the edge going forward. A short distance below the beam the attachment is bent (to the right or left, as may be desired,) sidewise, nearly at right angles. This horizontal portion $d$ may be extended, say from six to ten inches, or as far as it is required that it should deviate from the central line of the plough. It then is bent again abruptly, and extends thence downward in a vertical or nearly vertical direction, as at $f$, say from eight to twelve inches, or nearly to the ground. Thence it bends obliquely inward and downward to the central line, as shown at $g$; and finally, its point $h$ turns down vertically, all substantially as represented in the drawings. The part $g$, which runs in the earth, also is inclined somewhat from back to front, so that it will lift and turn the earth somewhat, and scrape the grass and weeds away. This part is also sharpened in front, so as to pass through the ground freely and cut its way through the grass and weeds. The point $h$ is in line with the front of the shovel or shoe B, and a few inches forward of it. The point also turns downward a little, so as to enter the ground readily.

This simple instrument attached to any plough, in the place of a coulter, is very effective in cultivating between rows of cotton, corn, and drilled crops. It effectually cuts up the weeds, leaves the ground light and clean, and enables one to cultivate very closely to the growing plants. It can be gauged to any depth in the ground by the shovel or shoe which follows after, and is, in all respects, a very simple, cheap, effective, and labor-saving instrument.

What I claim as my invention, and desire to secure by Letters Patent, is—

The attachment C, to shovel or other ploughs, when shaped and operating substantially as and for the purpose herein specified.

The above specification of my improved coulter cultivating attachment to shovel-ploughs signed by me this 1st day of September, 1866.

ISAAC X YOUNG.
his mark.

Witnesses:
I. T. WATSON,
B. R. NEBLETT.